United States Patent [19]

Pascaru

[11] Patent Number: 5,257,739
[45] Date of Patent: Nov. 2, 1993

[54] RISER FOR INDUSTRIAL PRETREATMENT WASHERS

[76] Inventor: Michael J. Pascaru, 25815 Briarwood Ct., Westlake, Ohio 44145

[21] Appl. No.: 882,494

[22] Filed: May 13, 1992

[51] Int. Cl.$^5$ .............................................. B05B 1/20
[52] U.S. Cl. ................................. 239/266; 239/587.3
[58] Field of Search ............... 134/124, 131, 108, 186, 134/103; 239/587.3, 587.4, 565, 587.1, 266-269; 285/156, 158, 33, 332, 261, 319

[56] References Cited

U.S. PATENT DOCUMENTS

| | | | |
|---|---|---|---|
| 1,758,115 | 5/1930 | Kelly | 239/587.1 X |
| 1,866,197 | 7/1932 | Cunningham | 239/587.5 X |
| 2,392,540 | 1/1946 | Lyman | 239/266 X |
| 2,757,966 | 8/1956 | Samiran | 239/266 X |
| 3,663,043 | 5/1972 | Walton | 285/261 X |
| 3,712,645 | 1/1973 | Herter | 285/261 X |
| 3,727,926 | 3/1973 | Fukushima | 285/261 |
| 4,709,713 | 12/1987 | Kuhl | 134/131 X |
| 5,080,404 | 1/1992 | Sauer | 285/319 X |
| 5,094,482 | 3/1992 | Petty et al. | 285/319 |
| 5,131,687 | 7/1992 | Marohon | 285/319 X |
| 5,143,298 | 9/1992 | Prokopoff | 239/587.4 X |
| 5,176,406 | 1/1993 | Straghan | 285/319 X |

Primary Examiner—Andres Kashnikow
Assistant Examiner—Kasin Weldon
Attorney, Agent, or Firm—James H. Tilberry

[57] ABSTRACT

A washer booth riser of interconnecting pipe sections and at least one spray nozzle connected to each pipe section. The pipe sections and nozzles can be integrally plastic molded to eliminate leaking between risers and spray nozzles. A polymer selected from one of the polyolefins, such as polypropylene, is used as the preferred molding plastic because of its physical properties which are desirable in a washer booth environment and because polypropylene, unlike other plastics used for washer booth risers, such as polyvinylchlorides, can be recycled. By making the risers in sections of about one foot each in length, each nozzle can be easily aligned to spray in any desired horizontal direction. The pipe sections are held together by quick connect and disconnect fastening apparatus.

11 Claims, 14 Drawing Sheets

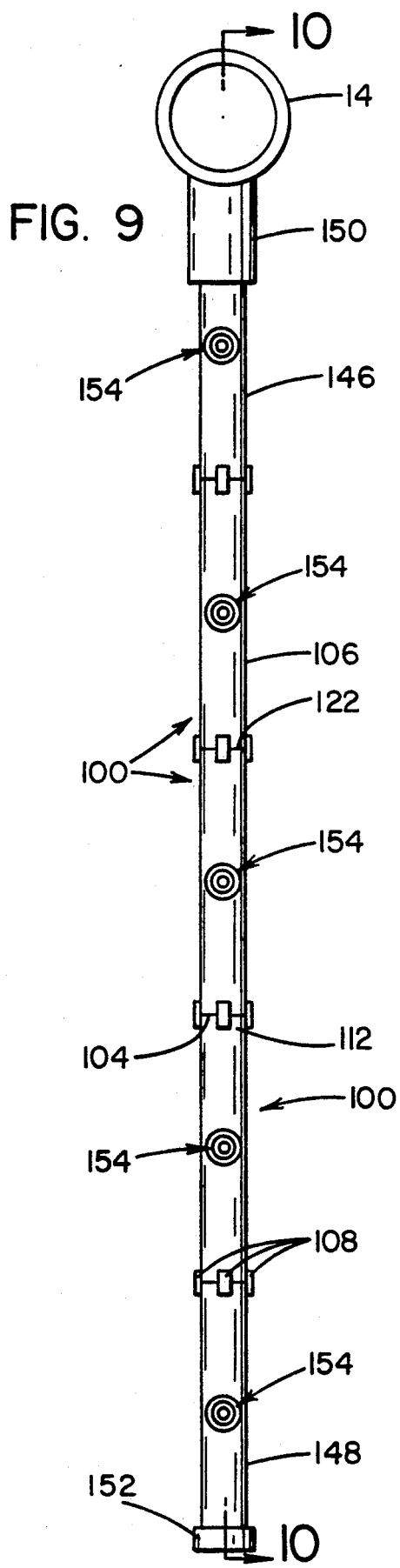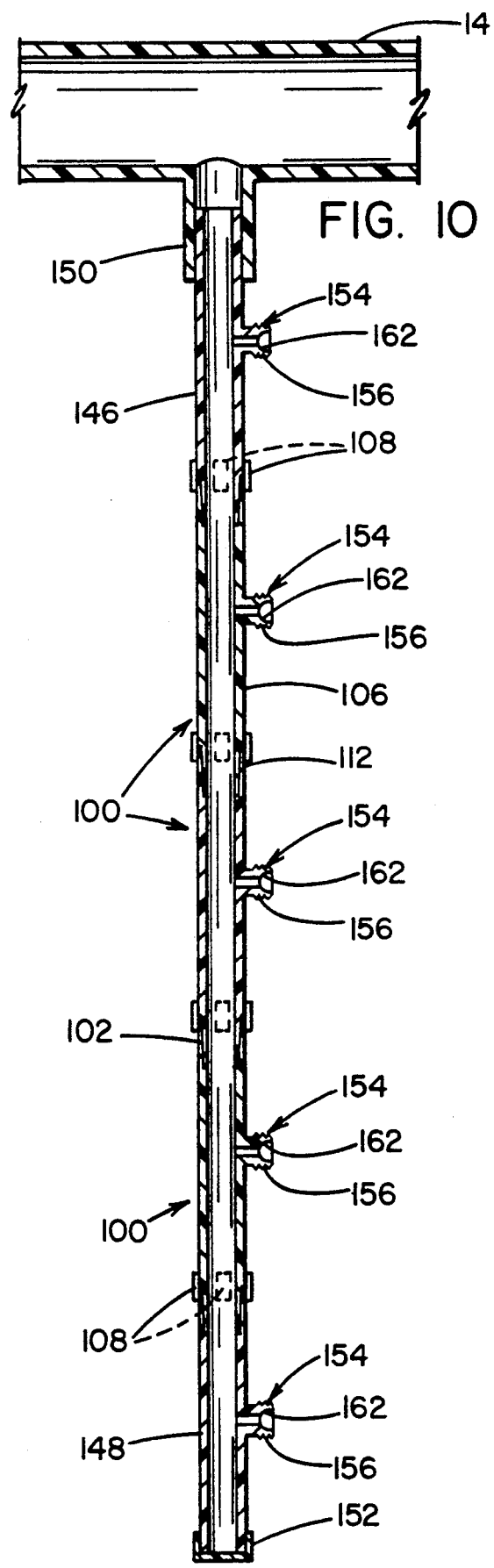

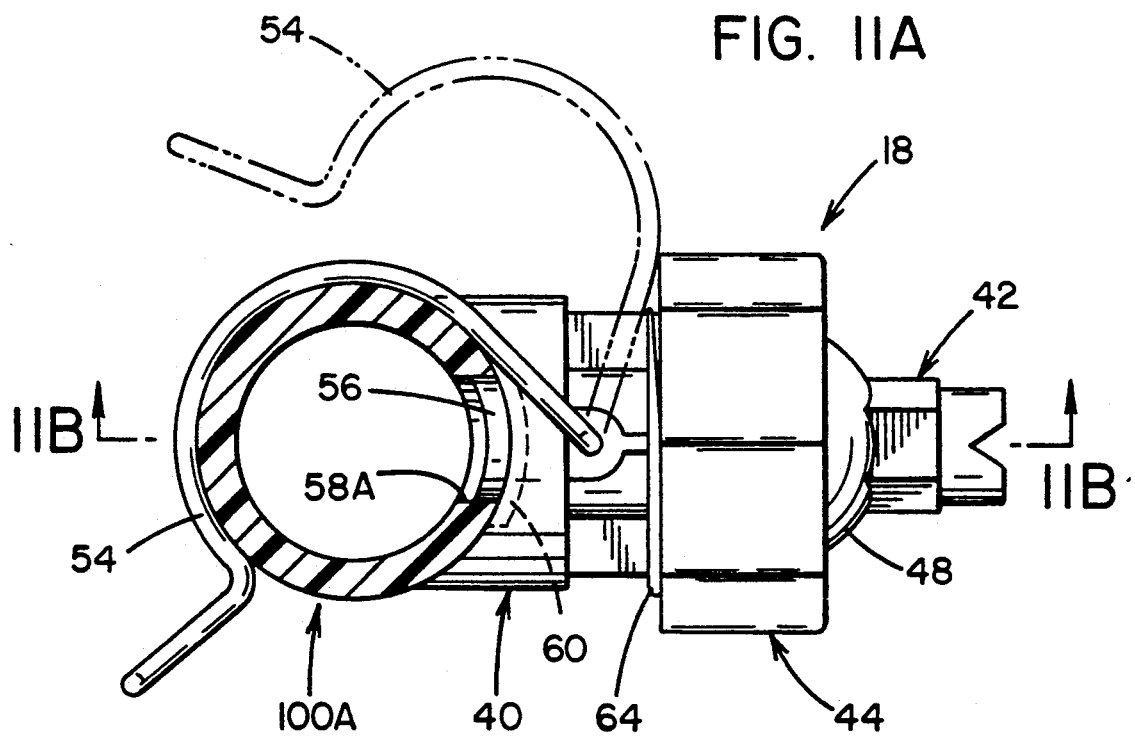

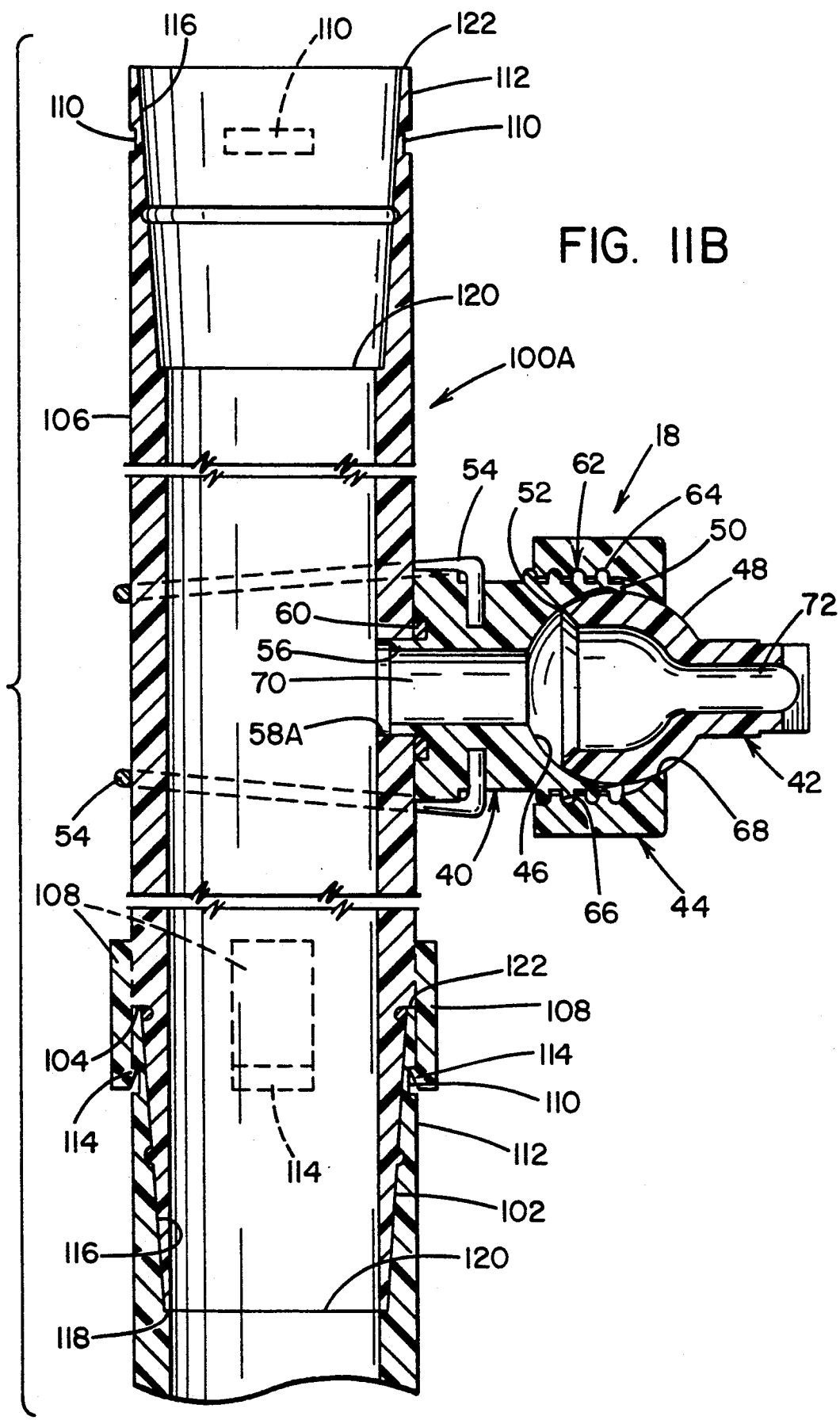

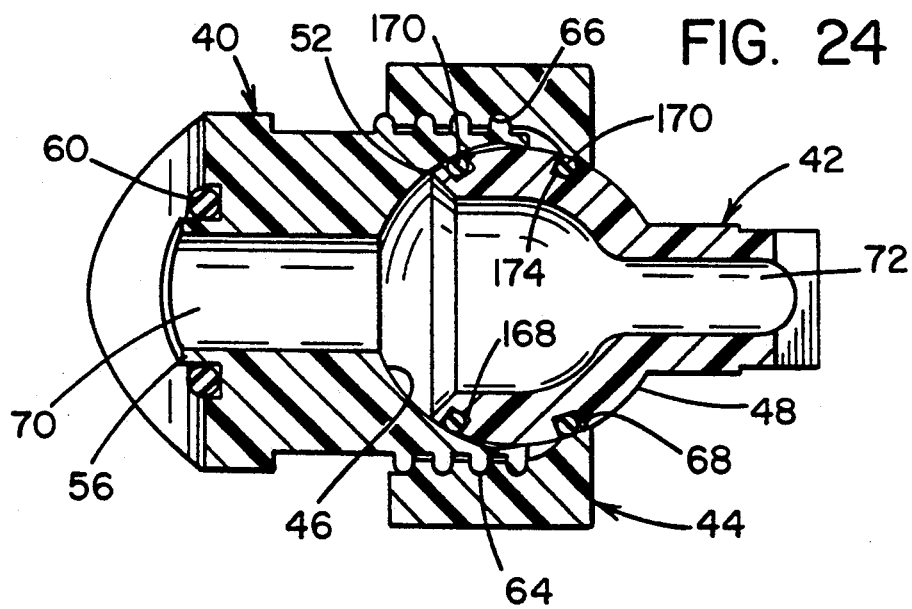
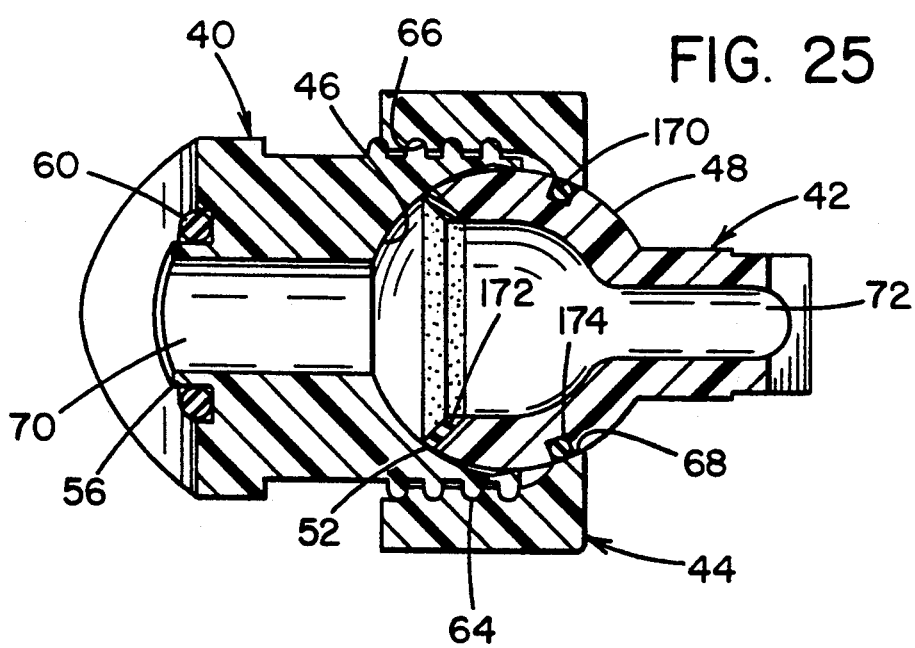

RISER FOR INDUSTRIAL PRETREATMENT WASHERS

BACKGROUND OF THE INVENTION

1. Field of Invention

The field of invention is industrial spraying equipment to clean, rinse, and/or chemical-treat articles of manufacture. The spraying takes place in a confined area, such as a spray or washer booth, in which various liquids are piped under pressure through overhead or bottom feed pipes, called headers, into a plurality of vertical pipes, called risers, connected to the headers, and then out through nozzles which are attached to the risers and which are adapted to spray workpieces in the washer booth.

2. Description of Related Art

Prior art washer booths are customarily made of steel, and are basically rectangular, with means for a parts conveyor to pass through. They are oftentimes equipped with a pair of plastic or steel header pipes spaced apart and running parallel and longitudinal to the washer booth floor or ceiling. Industrial liquids are stored in a tank underneath the washer booth floor and pumped through suitable plumbing to the headers. A bank of plastic or steel risers is connected to each header, extending vertically upward or downward along an adjacent washer booth wall. Extruded chlorinated polyvinylchloride (CPVC) is the state-of-the-art plastic commonly used for headers and risers. Several nozzles are secured to each riser of each bank of risers and are aimed inwardly to spray workpieces being conveyed between opposed banks of risers.

The spraying nozzles may be as simple as holes drilled in the risers, but mere holes have proved unsatisfactory for most industrial applications because they are difficult to clean, provide virtually no spray pattern, and are impossible to adjust. As a consequence, a three-part glass fiber or glass bead reinforced polyolefin nozzle has been developed comprising a body, a spraying tip, and a threaded nut to secure the tip to the body. The body has a part adapted to fit in a hole drilled in the riser, and the body is clamped to the riser by a quick release spring clamping mechanism. The body has an interior truncated spherical cavity in which a matching truncated spherical portion of the nozzle tip is adapted to fit for ball and socket swivel movement within the cavity. The exterior of the body is threaded to engage the tip securing threaded nut, referred to in the industry as a cap.

The polyolefin spray nozzle just described is now the standard of the industry and is readily available from many spray nozzle manufacturers. It is adjustable and is quickly removable from a riser for cleaning or changing the tip. To date it has been adequate for low pressure spraying applications in the range of 10 to 30 psi. However, the quick release spring clamp is relatively weak, and does not prevent leaking between the riser and the nozzle body. In applications where higher pressures above 30 psi, are required, leaking increases proportionately. In such applications, this type of spray nozzle is therefore unsuitable.

When pressures are high enough to cause leaking between the riser and the nozzle body, leaking also usually occurs between the nozzle body cavity and the mating truncated spherical portion of the nozzle tip. Further, when this occurs, leaking between the nozzle tip and the nozzle cap may also occur. In most applications, this leaking is tolerated only because there is no better nozzle available. However, the demand in the industry is increasingly for higher spraying pressures for spraying applications not possible with presently known nozzles.

In the present state of the art, risers have universally been made cut to length from a single longer piece of CPVC pipe, which results in considerable unusable scrap, since CPVC cannot be recycled for any purpose. If the riser becomes chemically obstructed, the entire riser must be disassembled in order to remove the obstruction. If any portion of the riser should be defective, the entire riser must be scrapped. Since the locations of nozzles on risers must be predetermined and pre-drilled, thereafter the only means to adjust the spray is by the limited available movement of the nozzle spray tip. A single nozzle, per se, cannot be shifted vertically or horizontally to another quadrant of the riser without shifting the entire riser, in which event all of the other nozzles must be similarly shifted.

Chlorinated polyvinylchloride (CPVC) is not compatible with polyolefins, in that the two plastics cannot be glued, welded, molded, or otherwise bonded together. Accordingly, molded glass-filled polyolefin spray nozzles must be secured to extruded CPVC risers with brackets or by threading. It is not feasible to mold CPVC risers because of the high cost of tooling, and the nature of the process is labor intensive. Extruded CPVC pipe is relatively inexpensive, both in labor and tooling cost, however. CPVC risers are limited to washer booth operations in which the temperature of the bath does not exceed 180°. For similar reasons of economy, polyolefins have not been used for risers because the plastic must be glass-filled for strength, and glass-filled polyolefins are not extrudable.

SUMMARY OF THE INVENTION

The present invention is an improvement in washer booth risers and nozzles presently used in washer booths.

Instead of cutting a riser to length from a single piece of extruded stock CPVC pipe, normally commercially available in lengths of 20 feet, the inventive riser comprises a series of short uniform pipe segments molded from a glass fiber or glass bead reinforced polymerized olefinic monomer, of which polypropylene is an example. The pipe segment is approximately twelve inches in length and is adapted to be longitudinally interconnected with leakproof joints. Thus no more than one pipe segment of less than twelve inches need be cut to length, if necessary, thereby reducing scrap pipe to less than twelve inches per riser, and the scrap can be recycled, thereby eliminating substantially all pipe scrap loss. Furthermore, by molding the pipe segments from a glass fiber or glass bead reinforced polyolefin, the temperature of the bath can be increased to 220° F., from the 180° F. to which the CPVC risers are limited. In addition, the interior wall surface of a polyolefin pipe segment is inherently smoother than the corresponding interior wall surface of extruded CPVC riser pipe, so there is less tendency for contaminants to adhere and to accumulate on polyolefin interior wall surfaces. This results in longer life and less maintenance and downtime with molded polyolefin riser pipe.

A nozzle body of compatible polyolefin is integrally molded into each polyolefin pipe segment, which eliminates any possibility of pressure loss due to leakage between the riser and the nozzle body. Also, nozzle bodies in one pipe segment may be aligned for spraying independent of the nozzle bodies in the other riser pipe segments. The nozzle bodies may be adapted to provide the spraying function, per se, or they may serve as standard nozzle bodies upon which nozzle tips and caps are mounted. In the latter case, leakage between the bodies and the tips is prevented by placing novel sealing means about the truncated spherical portion of the spray tip for sealing engagement with the concave surface of the body spherical cavity.

In one preferred embodiment, an O-ring groove is formed adjacent the truncated rim of the spray tip spherical body and an O-ring is fitted in the groove for sealing engagement between the body cavity and the spray tip. In another preferred embodiment, the truncated edge is molded from a plastic with a hardness modulus less than the spray tip per se, and sufficiently compressible against the body internal cavity to obtain sealing therebetween.

To prevent leakage between the spray tip and the cap, an O-ring groove is cut in the spherical surface of the spray tip remote from the truncated rim and an O-ring is placed in the groove for sealing engagement between the spray tip and the cap.

As thus described, the inventive segmented riser provides virtually universal adjustment means for its spray nozzles. By providing strategic sealing means between the three basic parts of a conventional spray nozzle, the inventive riser is rendered suitable for use in high pressure applications.

OBJECTS OF THE INVENTION

It is therefore among the objects of this invention to provide a molded segmented riser for use in industrial spraying in which a spray nozzle is simultaneously and integrally molded to each segment.

It is another object of this invention to provide a segmented riser in which each segment is shiftable about a common longitudinal axis.

It is another object of this invention to provide a segmented riser in which riser scrap is reduced to less than the length of one riser segment.

It is yet another object of this invention to provide a segmented riser in which pressure loss between the riser and spray nozzle bodies is eliminated.

It is still another object of this invention to provide quick release means to secure riser segmented pipe portions together to form a riser.

It is still another object of the invention to provide a riser made from segmented pipes which are indexable about a common axis.

It is a further object of this invention to provide nozzles for a riser which have greater resistance to leakage under high pressure applications than prior art nozzles.

It is a still further object of this invention to provide a riser made from a recyclable glass fiber or glass bead reinforced polyolefin plastic.

It is yet a still further object of this invention to provide a riser which reduces unusable scrap during manufacture, is easier and quicker to install in a washer booth, is easier to clean and to keep clean, and is easier to dismantle from a washer booth than prior art risers.

It is still another object of the invention to provide a molded glass-filled polyolefin riser and compatible glass-filled polyolefin spray nozzle bodies integrally molded thereto which can be used with a bath temperature at least 40° higher than the bath temperatures which can be safely used with CPVC risers.

Other objects and advantages of the invention will become apparent to those skilled in the art upon reading the following specification taken in conjunction with the accompanying drawings.

BRIEF DESCRIPTION OF THE DRAWINGS

FIG. 9 is an elevational view of a preferred embodiment of an inventive segmented riser;

FIG. 10 is a sectional view taken along the line 10—10 of FIG. 9;

FIG. 11A is a plan view of a preferred embodiment of the invention in which the inventive riser is fitted with the prior art nozzle shown also in FIGS. 3 through 6;

FIG. 11B is an elevational sectional view of the preferred embodiment of FIG. 11A, taken along the line 11B—11B of FIG. 11A;

FIG. 24 is an elevational view in section of a modified spray nozzle similar to the spray nozzle shown in FIG. 18;

FIG. 25 is an elevational view in section of a modified spray nozzle similar to the spray nozzle shown in FIG. 19;

DETAILED DESCRIPTION OF PRIOR ART

Figure 1:
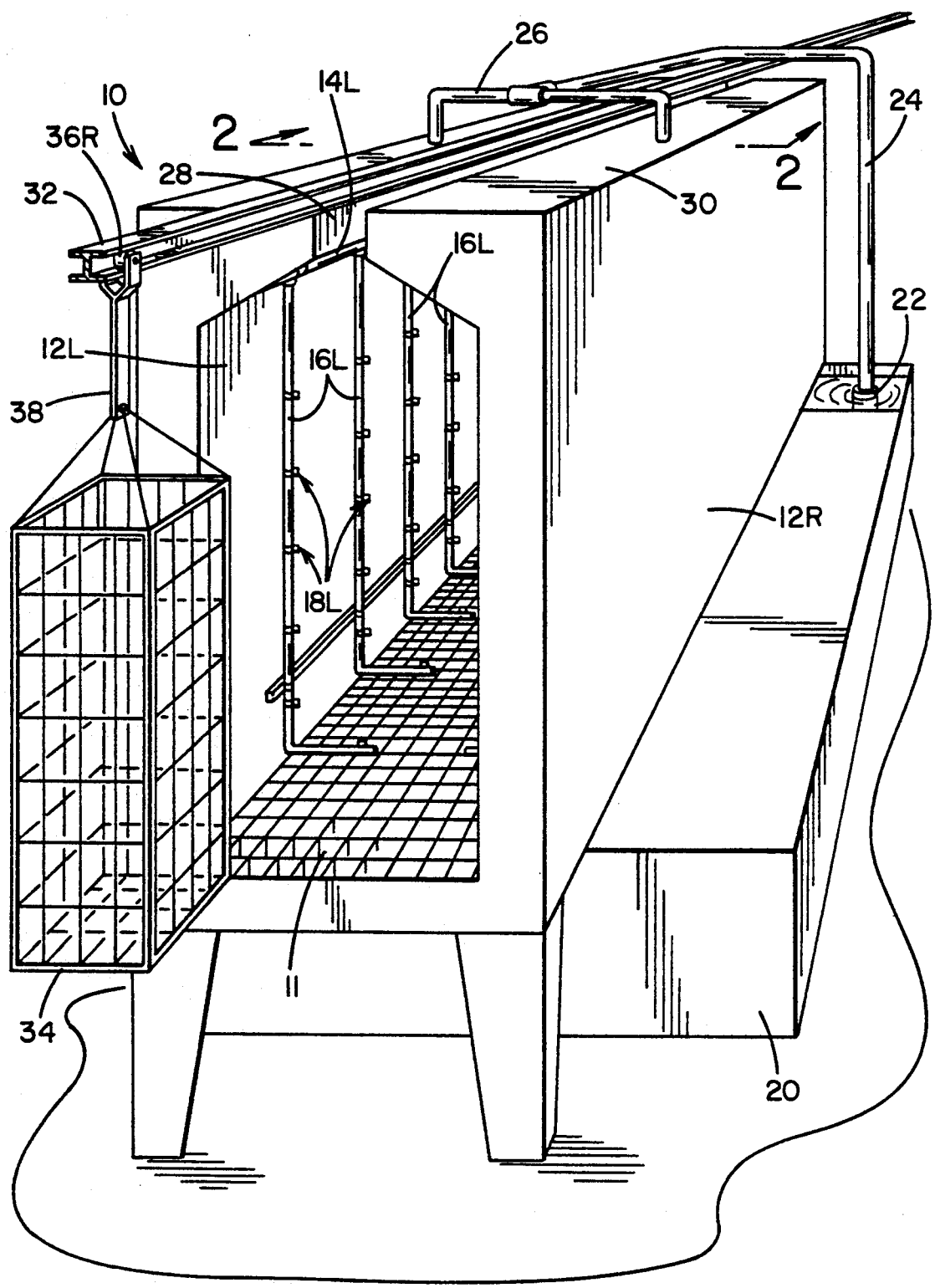
FIG. 1 is a perspective view of a prior art washer booth showing prior art headers, risers, and nozzles.
Figure 2:
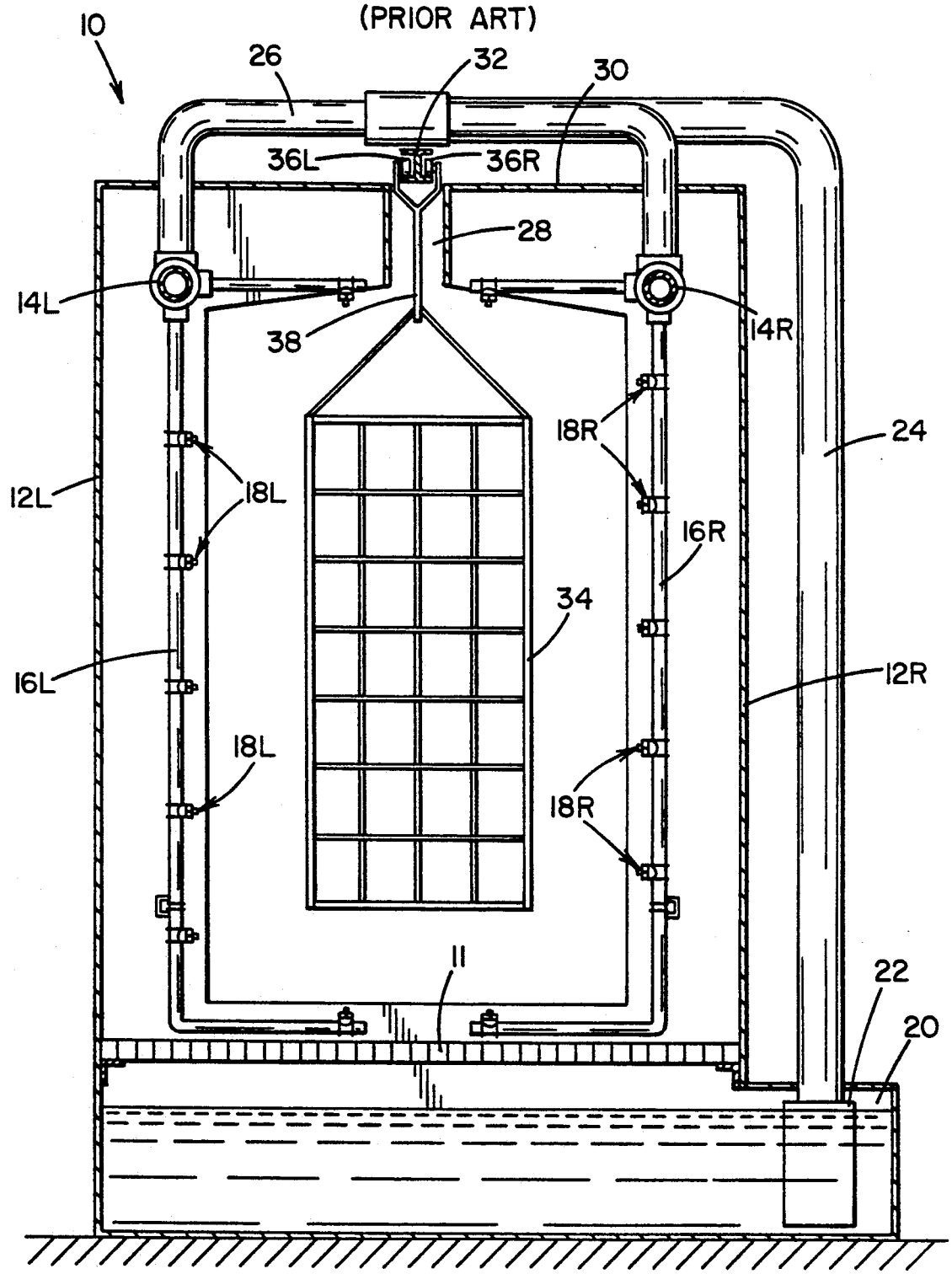
FIG. 2 is a section taken along the line 2—2 of FIG. 1.

Shown in FIGS. 1 and 2 is a state-of-the-art industrial washer booth 10 in which can be seen adjacent to washer booth panel 12L a header pipe 14L and one-piece riser pipes 16L attached to header pipe 14L. Spray nozzles 18L are secured at about one-foot intervals on riser pipes 16L. The floor of the washer booth 10 comprises steel or plastic grating 11 through which spray liquids drain into storage tank 20. A submersible recirculating pump 22 is mounted in storage tank 20, from which the liquid is recirculated up pipe 24 to cross over pipe 26 and then down into header pipes 14L and 14R and riser pipes 16L and 16R, as shown in FIG. 2. A longitudinal opening 28 is provided in ceiling 30 of washer booth 10 adapted to receive an I-beam guide rail 32 for supporting work product baskets 34. The work product baskets 34 are suspended from the guide rail 32 by means of guide rail rollers 36L and 36R and wire support harnesses 38 depending from rollers 36 and secured to baskets 34. The baskets 34 may be conveyed through the washer booth 10 by any means well known in the prior art such as a motor-driven endless wire rope or chain, or by pushing or pulling the baskets through the washer boot 10 by a washer booth operator.

Figure 5:
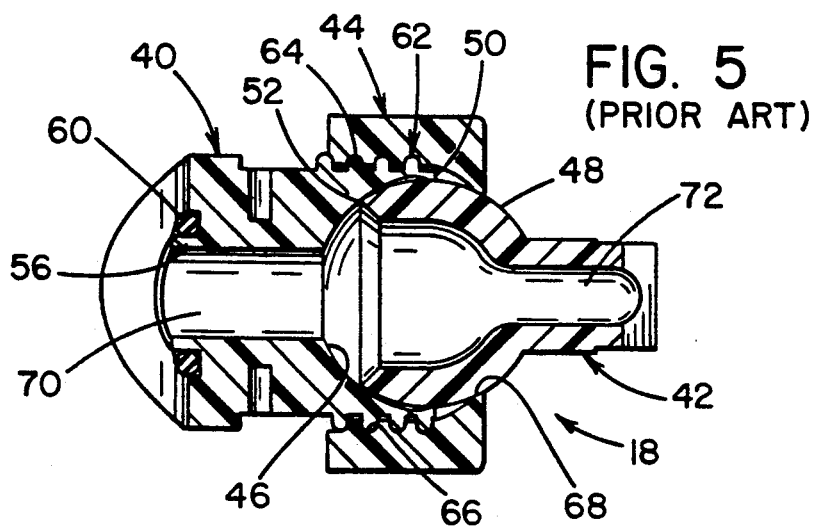
FIG. 5 is a section view of the spray nozzle taken along the line 5—5 of FIG. 3.
Figure 6:
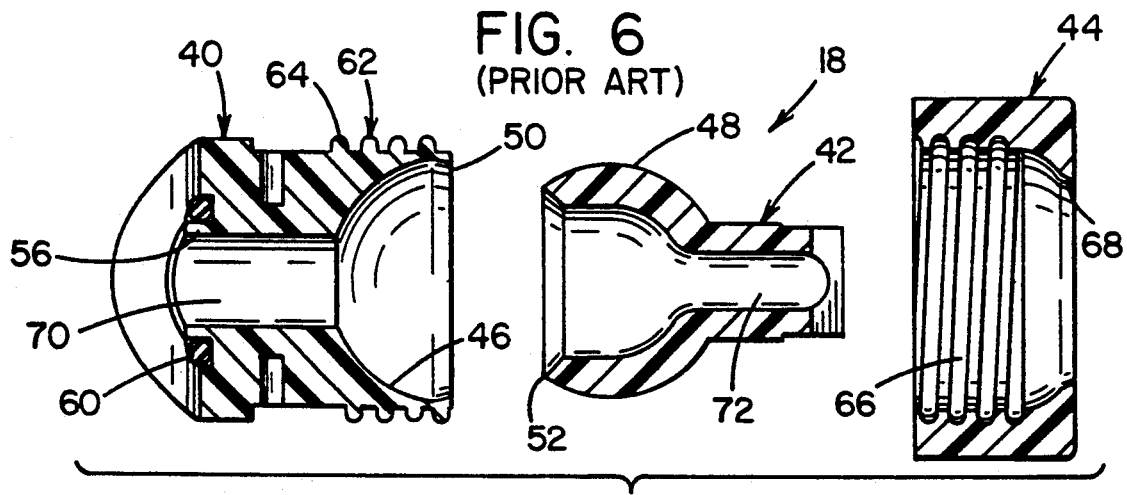
FIG. 6 is an exploded section view of the spray nozzle taken along the line 6—6 of FIG. 4.

The prior art spray nozzles 18, illustrated in FIGS. 3 through 6, comprise a body 40, a nozzle tip 42 and a cap 44, all made from a molded glass fiber or glass bead reinforced polyolefin. As best shown in FIG. 5, body 40 is provided with a spherical cavity 46, into which spherical portion 48 of nozzle tip 42 snap fits to form a ball and socket joint. Spherical cavity 46 is truncated to form a rim 50, the interior diameter of which is slightly less than the outside major diameter of nozzle tip spherical portion 48. The modulus of elasticity of the body is selected to permit the rim 50 to expand enough to permit spherical portion 48 to enter body cavity 46, whereinafter the rim 50 recovers to its original unexpanded diameter. Spherical portion 48 is also truncated to form a rim 52 which is urged into pressure contact with body cavity 46 to form a seal therebetween.

Figure 3:
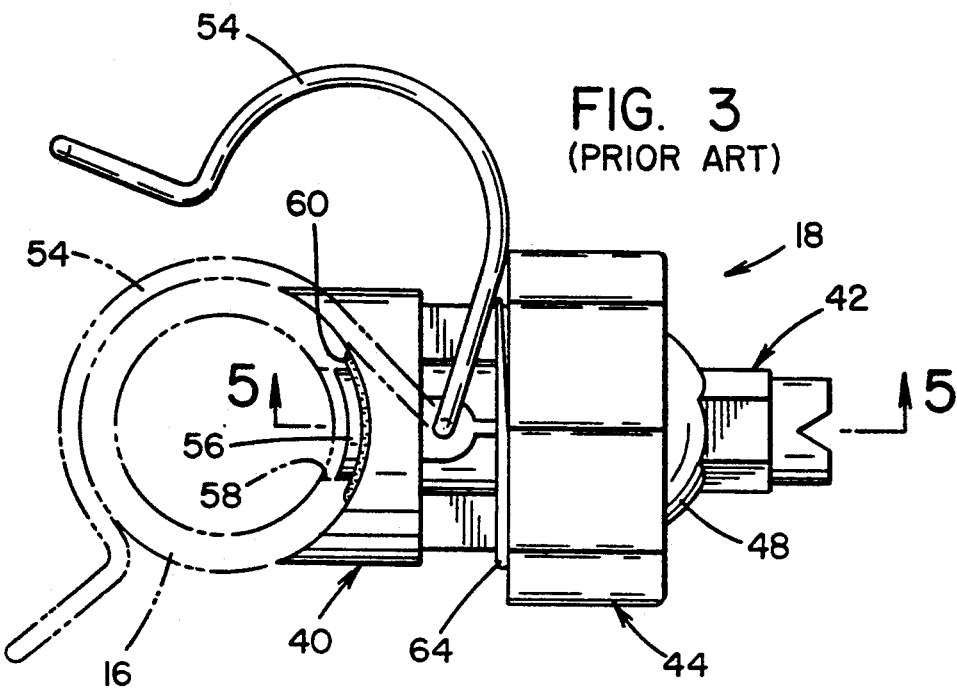
FIG. 3 is a plan view of a prior art spray nozzle.
Figure 4:
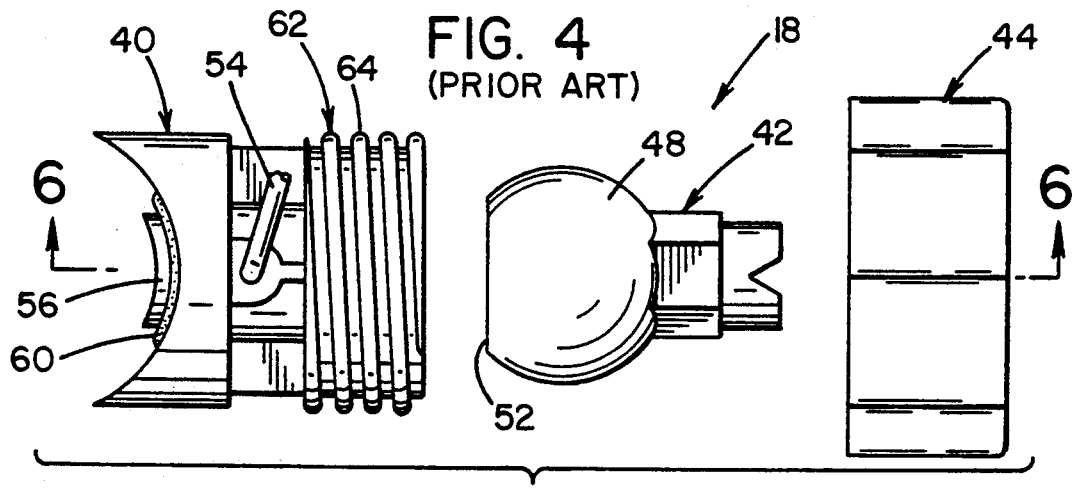
FIG. 4 is an exploded plan view of the spray nozzle shown in FIG. 3.

Body 40 includes a spring wire clamping bracket 54, FIG. 3, which snaps against the backside of a riser 16 to hold body extension lip 56 in riser hole 58. An O-ring 60 provides a seal between riser hole 58 and extension lip 56. Body 40 also includes a threaded portion 62 having threads 64 sized to threadedly engage with threads 66 of cap 44, FIG. 5. Cap 44 also is provided with a spherical groove 68 which makes spherical bearing contact about the surface of nozzle tip 42 spherical portion 48. By threading cap 44 onto body 40, groove 68 makes sealing contact with spherical portion 48 and urges rim 52 into sealing contact with the wall of body cavity 46. Communication with the interior of riser 16 is provided by alignment of bore 70 of body 40 and bore 72 of nozzle tip 42, FIGS. 5 and 6, with hole 58 of riser 16, FIG. 3.

Although contact between cap groove 68 and tip spherical portion 48 and contact between nozzle tip rim 52 and the wall of body internal cavity 46 are intended to seal, the sealing is at best imperfect, and is obtained only under low pressures of about 10 to 30 psi. Some leakage occurs between the riser and the body, between the body and the tip, and between the tip and the cap, all of which combine to produce a pressure drop in the system with resultant loss of efficiency. As the pressure in the system increases, leakage increases proportionately. At pressures of about 120 psi, the pressure losses are so great that the described nozzles cease to be functional.

DETAILED DESCRIPTION OF PREFERRED EMBODIMENTS OF THE INVENTION

Figure 7:
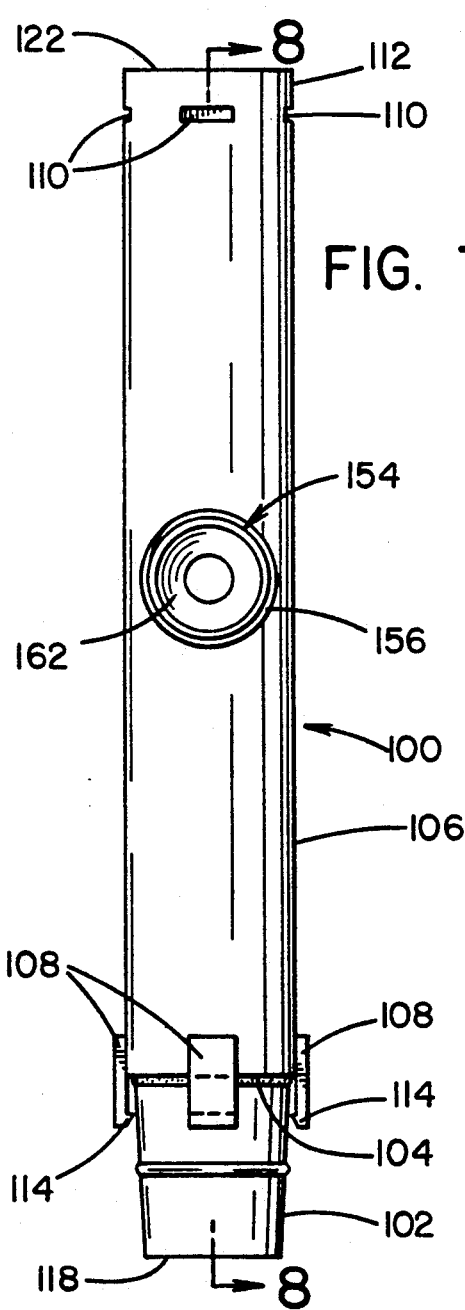
FIG. 7 is an elevational view of a preferred embodiment of an inventive riser segmented pipe.
Figure 8:
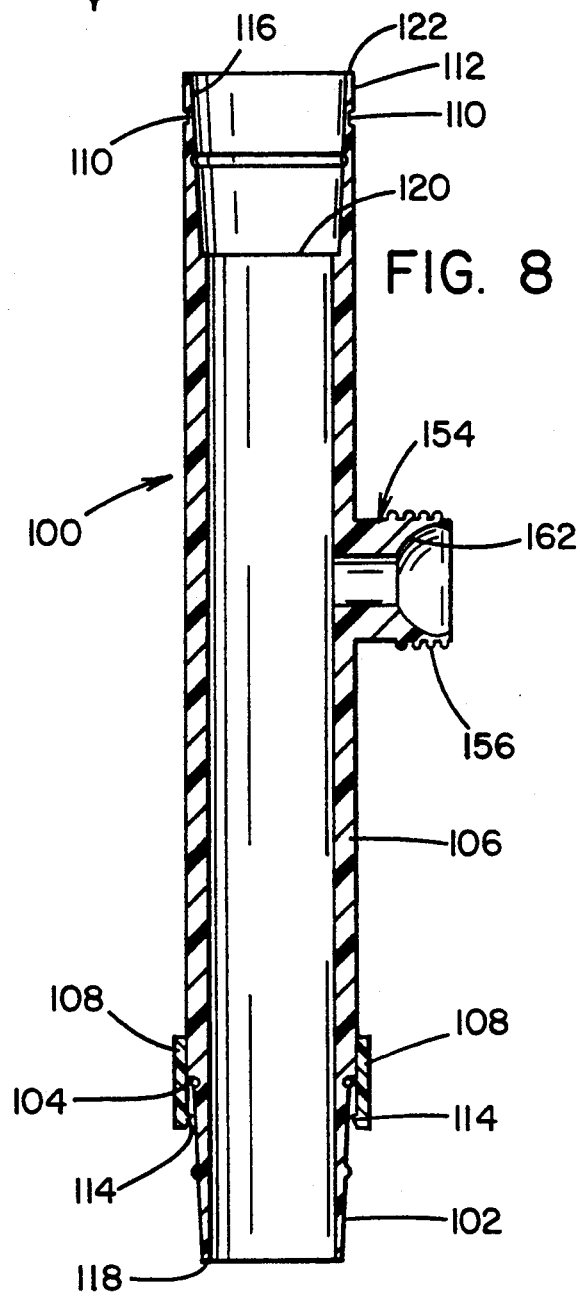
FIG. 8 is a sectional view taken along the line 8—8 of FIG. 7.

Referring to FIGS. 7 and 8, therein is shown a preferred embodiment of an inventive riser pipe segment 100, molded from a glass fiber or glass bead reinforced polyolefin which has been selected for its high strength and resistance to high temperatures and corrosive liquids. Polypropylene is an example of a preferred polyolefin for the purposes of this invention. CPVC cannot match the physical properties of these polyolefins when used as risers and headers. FIGS. 7 and 8 illustrate a tubular inventive riser pipe segment approximately twelve inches in length, having a circular cross section. The riser wall thickness matches current Schedule 80 plastic pipe sizes. One end 102 is either molded or machined to form a frusto-conical portion of the pipe segment. A ridge 104 forms a plane of demarcation between the frusto-conical portion 102 and the cylindrical portion 106. Detents 108 are secured to the cylindrical portion 106 and project downwardly in axial alignment below the ridge 104. In a preferred embodiment, detents 108 are secured about the circumference of the cylindrical portion 106 and, as shown in the preferred embodiment of FIGS. 7 and 8, they are radially spaced apart at 90° intervals. Indentations 110 are formed in the opposite end 112 of the pipe segment in radial alignment with detents 108. The latch portions 114 of the detents 108 of a second pipe segment make locking engagement with grooves 110 when two or more pipe segments are telescopically joined, as shown in FIGS. 9 and 10.

Figure 11:
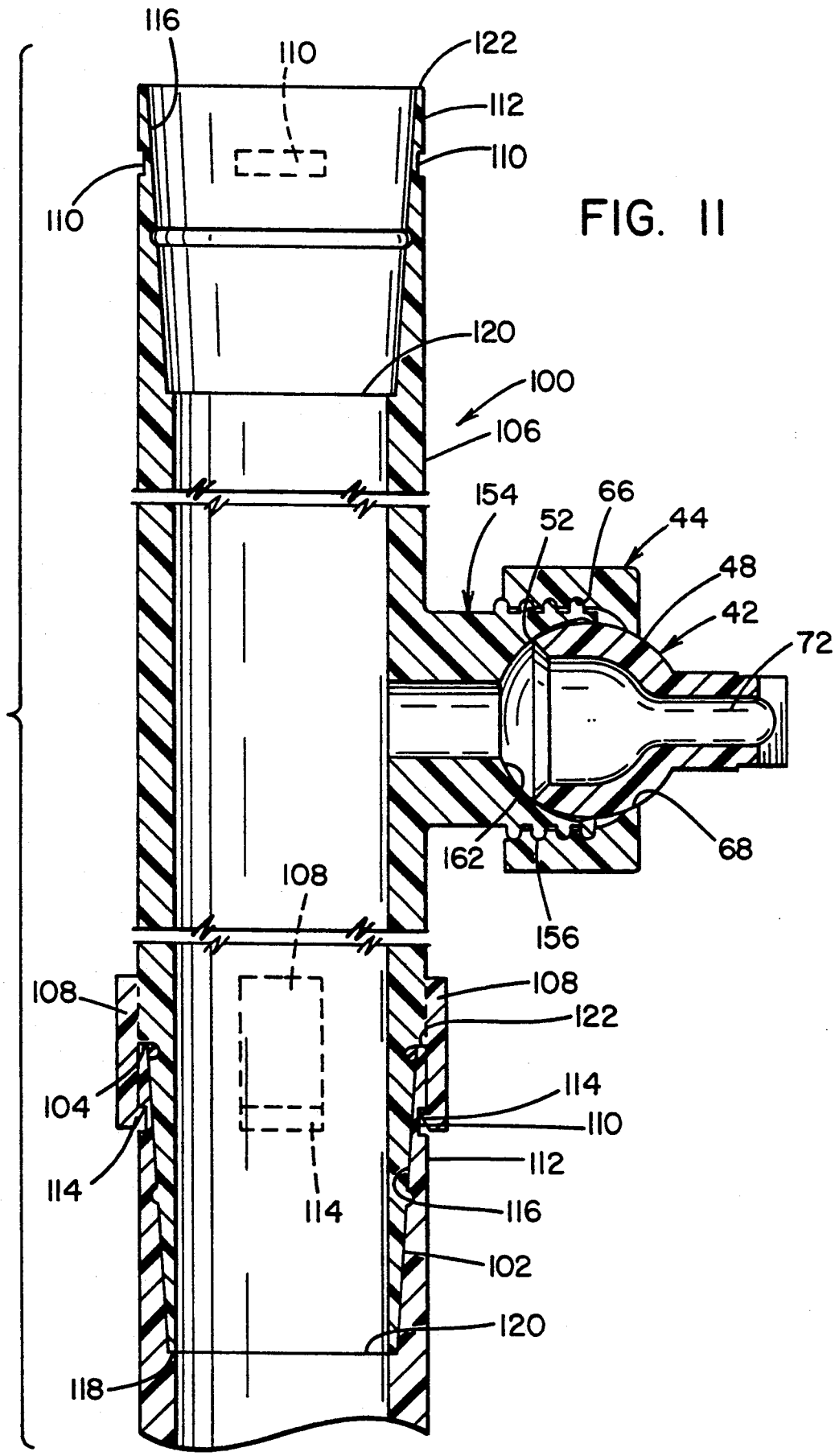
FIG. 11 is an elevational view in section of a preferred embodiment of a riser pipe segment showing a spray nozzle tip and cap assembled on a pipe section molded body.

As shown in FIG. 11, a frusto-conical cavity 116 is formed in a lower pipe segment to receive an end 102 therein of an upper pipe segment. Rim 118 of the upper pipe segment bottoms on ledge 120 of the lower pipe segment, and ridge 104 of upper pipe segment bottoms on rim 122 of the lower pipe segment. There is a slight negative tolerance between the frusto-conical cavity 116 of the lower pipe segment and the frusto-conical end portion 102 of the upper pipe segment which assures precise alignment of pipe segments and prevents leaking between the frusto-conical mating portions when they are subjected to high hydraulic pressure.

Although the pipe segment 100 of FIG. 11 with the integrally molded body 154 is the preferred embodiment of the invention, it is also contemplated that the pipe segment 100 be modified as shown in FIGS. 11A and 11B, wherein pipe segment 100A is modified to receive and to function with prior art nozzles of the type shown in FIGS. 3 through 6, and as described in the specification portion captioned "Detailed Description of Prior Art," set forth hereinabove. Pipe segment 100A differs from pipe segment 100 in that the molded body portion 154 of pipe segment 100 is eliminated, thereby enabling the prior art nozzle 18 extension lip 56 to engage the riser hole 58A of pipe segment 100A. As best shown in FIG. 11A, the spring wire clamping bracket 54 engages the back side of pipe segment 100A to hold the nozzle 18 in place on pipe segment 100A, in the same manner as shown in FIG. 3 with respect to prior art riser 16.

Figure 13:
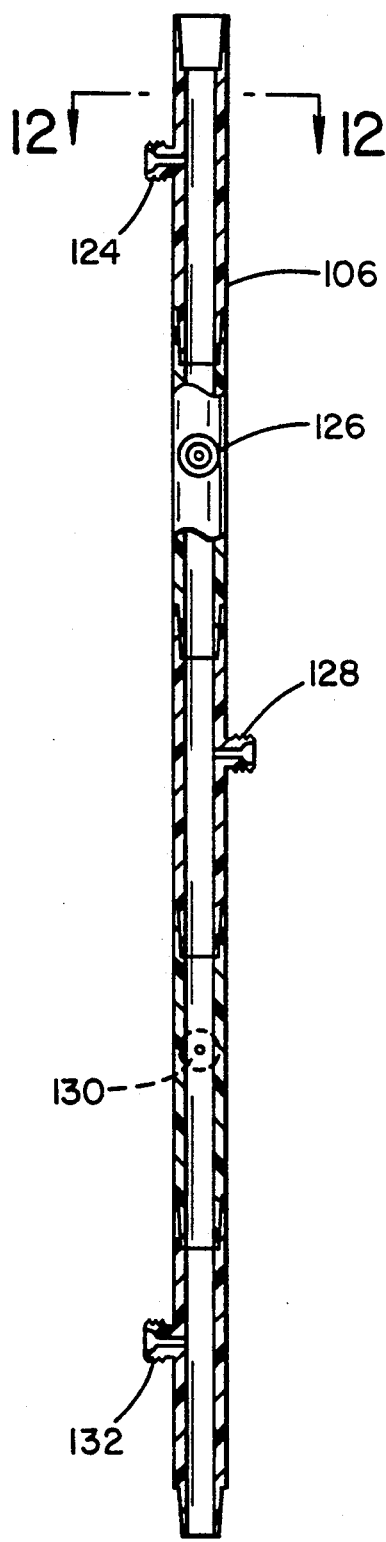
FIG. 13 is an elevational view in section taken along the line 13—13 of FIG. 12.
Figure 12:
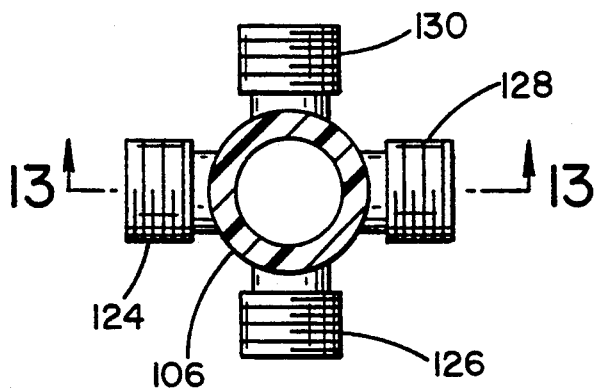
FIG. 12 is a plan view of a riser in accordance with a preferred embodiment of the invention taken along the line 12—12 of FIG. 13.

The detents 108 and indentations 110 of FIGS. 7 through 11 assure proper alignment of the spray nozzles and provide for quick and accurate indexing of one pipe segment with respect to another pipe segment in order to align nozzles in other predetermined positions. Thus, as shown in FIGS. 9 and 10, all nozzles 154 are aligned to spray in the same direction. FIGS. 12 and 13 show a riser comprised of five pipe segments in which the segments are sequentially shifted ninety degrees about the longitudinal axis of the riser, progressively one with respect to the other. Thus, viewing FIG. 12 in terms of the cardinal points of the compass, spray nozzle 124 projects West; spray nozzle 126 projects South; spray nozzle 128 projects East; and spray nozzle 130 projects North, whereinafter the nozzle alignment pattern repeats with nozzle 132 also projecting West. Intermediate points of the compass may also be selected for the positioning of yet other detents and indentations to provide additional nozzle alignments to which the pipe sections may be quickly indexed.

Figure 14:
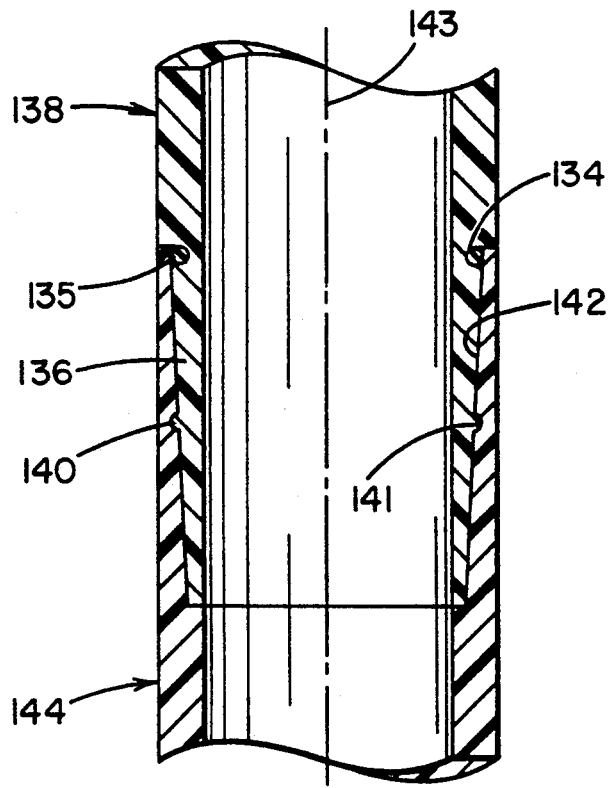
FIG. 14 is a fragmentary elevational view in section showing a preferred means of connecting adjacent ends of riser pipe segments.

FIG. 14 illustrates modified slip fit means of interconnecting pipe sections. In this preferred embodiment, an annular O-ring groove 134 is formed in the frusto-conical portion 136 of pipe section 138 to receive an O-ring 135. O-ring 135 provides a seal between pipe sections 138 and 144. An annular bead 140 is also formed on the wall of frusto-conical portion 136 which locks in annular groove 141 of frusto-conical cavity 142 to secure pipe segment 138 to pipe segment 144. The tolerance between bead 140 and groove 141 may provide for a slip fit which permits pipe sections 138 and 144 to be rotationally shifted, one with respect to the other, about the vertical axis 143 of the pipe segments 138 and 144 to enable 360° horizontal alignment of nozzles. It is intended and understood with respect to FIG. 14 that the groove-bead relationship may be reversed, in that groove 141 can be formed in pipe section 138, and bead 140 can be formed on pipe section 144.

As shown in FIGS. 9 and 10, the top pipe segment 146 and the bottom pipe segment 148 may each be foreshortened, if necessary, in order to fit between the washer booth floor 11 and the header 14, FIGS. 1 and 2. As shown in FIGS. 9 and 10, top pipe section 146 is secured to a T-portion 150 of header 14 by known fastening means, such as cementing or threading, and pipe section 148 is closed off with a cap 152. Other means, such as quick release devices, are known in the art for connecting risers to headers, but are not described herein since they do not constitute a portion of the invention and a description of their various structures is not necessary for a full understanding of the invention.

Attention is directed to the fact that at least one spray nozzle body 154 is integrally molded into each pipe segment, as shown in FIGS. 7 through 11 and 12 through 19. In addition, external threads 156, FIG. 11, are molded on the nozzle body 154 to threadedly engage the interior threads 66 of cap 44. Cap 44 is the same structure as prior art cap 44 of FIGS. 5 and 6, and is provided with the same interior groove 68. Also, as shown in FIG. 11, a standard nozzle tip 42 fits in spherical cavity 162 of pipe segment nozzle body portion 154 to form a swivel ball and socket combination. Cap 44 threads onto body portion 154, whereupon cap annular interior groove 68 contacts the exterior spherical surface 48 of nozzle tip 42 to urge lip 52 of nozzle tip 42 into pressure contact with the wall of cavity 162.

Figure 15:
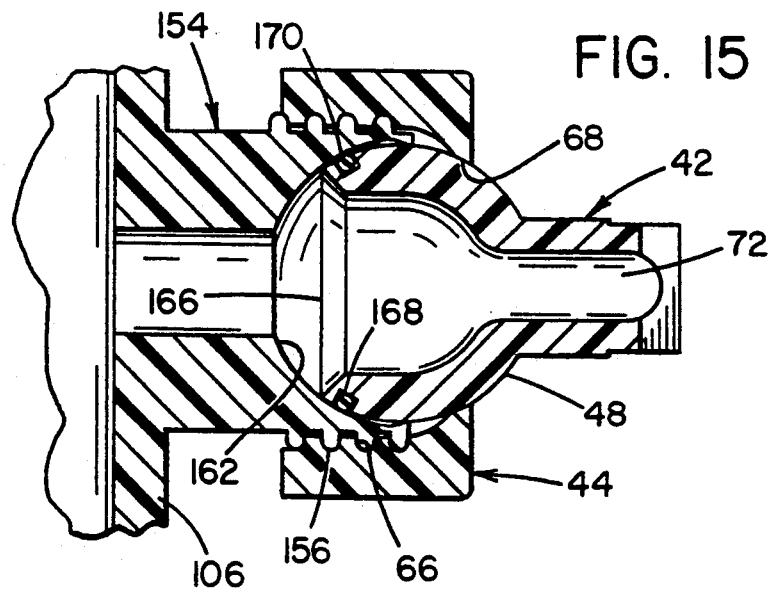
FIG. 15 is a fragmentary elevational view in section of a modified spray nozzle in accordance with the invention adapted to prevent leaking between the nozzle body and nozzle tip.
Figure 16:
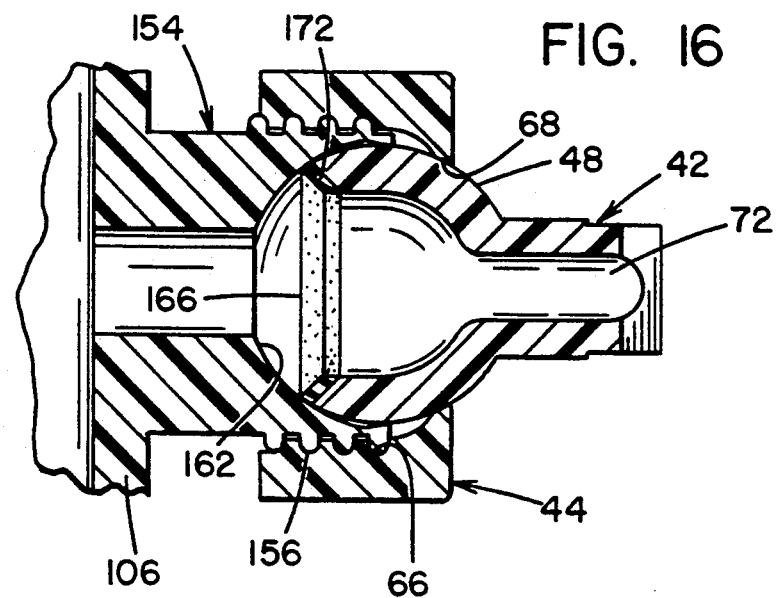
FIG. 16 is a fragmentary elevational view in section of a modified spray nozzle in accordance with the invention showing an alternative means to prevent leaking between the nozzle tip and the nozzle body.

In the preferred embodiment of the subject invention shown in FIG. 11, because a spray nozzle body is integrally molded in each pipe segment, leakage and consequent pressure loss between the riser pipe segments 100 and the spray nozzle body has been totally eliminated. Since this leakage accounts for a substantial amount of the pressure loss in the system, in many applications elimination of this pressure loss is sufficient for successful operation of the system, notwithstanding the fact that some leakage may continue to occur between the nozzle body and the nozzle tip, and the nozzle tip and the nozzle cap. However, the trend is for washer booths to be operated at ever increasing pressures in order to accommodate an ever widening range of work which can be treated in a washer booth. In the subject invention, higher ranges of pressures can now be accommodated, as shown in FIGS. 15 and 16, by increasing the sealing efficiency between the wall of the body cavity 162 and the nozzle tip spherical portion 48. In FIG. 15, an O-ring groove 168 is cut in the surface of the spherical portion 48 of spray nozzle tip 42 adjacent to the lip 166. An O-ring 170 is inserted in O-ring groove 168 to make pressure sealing contact between the wall of the body cavity 162 and spherical portion 48 of nozzle spray tip 42. In FIG. 16, another sealing embodiment is shown in which a washer-type seal 172 of the spherical portion 48 of spray tip 42 is molded and bonded integral with nozzle spray tip spherical portion 48 from a compatible plastic having a lower modulus of compressibility than that of the spherical portion 48, per se.

In the embodiments of the invention shown in FIGS. 15 and 16, the nozzle cap 44 is utilized to bring the sealing means 170 and 172, respectively, into sealing engagement with the wall of the body cavity 162, by turning cap 44 to increase the amount of engagement between body threads 156 and cap threads 66.

Figure 17:
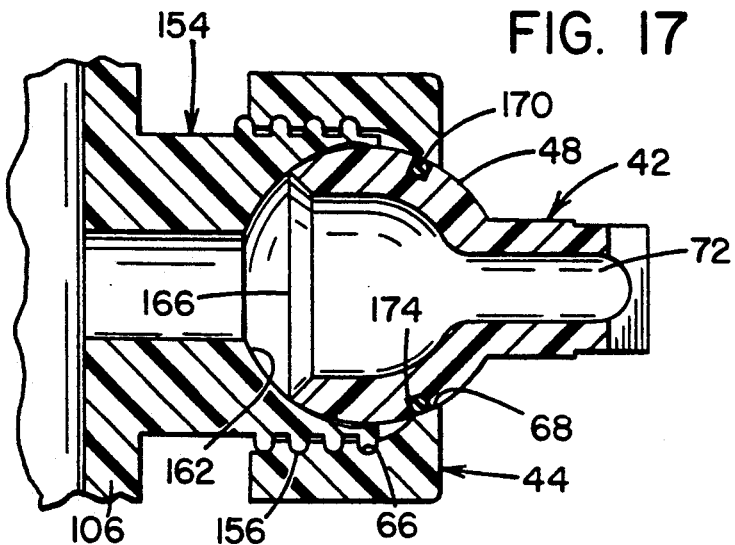
FIG. 17 is a fragmentary elevational view in section of a modified spray nozzle in accordance with the invention adapted to prevent leaking between the nozzle tip and the nozzle cap.

In the embodiment of the invention shown in FIG. 17, leakage between nozzle tip 42 and cap 44 is prevented by cutting an O-ring groove 174 in nozzle tip spherical portion 48 adjacent cap groove 68. An O-ring 170 is placed in groove 174 to provide sealing engagement between nozzle spray tip 42 and cap 44.

Figure 18:
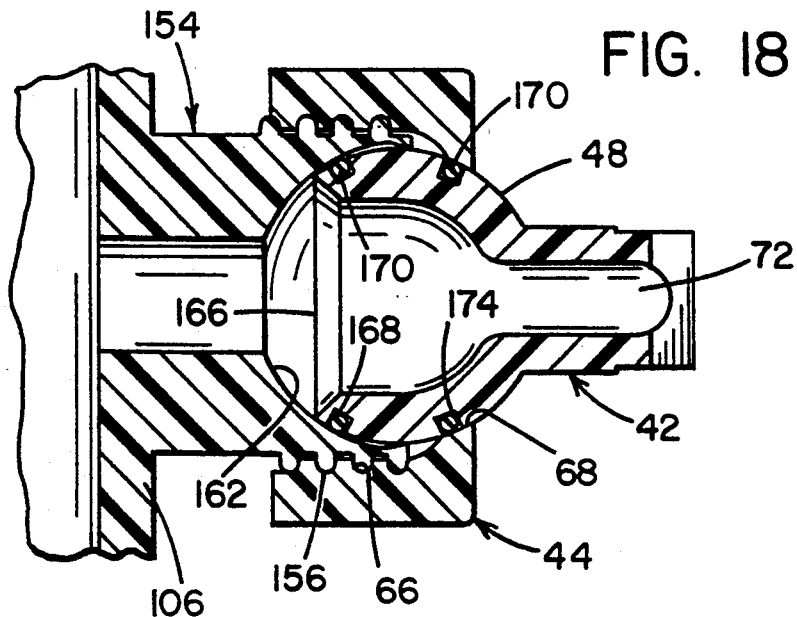
FIG. 18 is a fragmentary elevational view in section of a modified spray nozzle in accordance with the invention adapted to prevent leaking between the nozzle body and the nozzle tip and between the nozzle tip and the nozzle cap.
Figure 19:
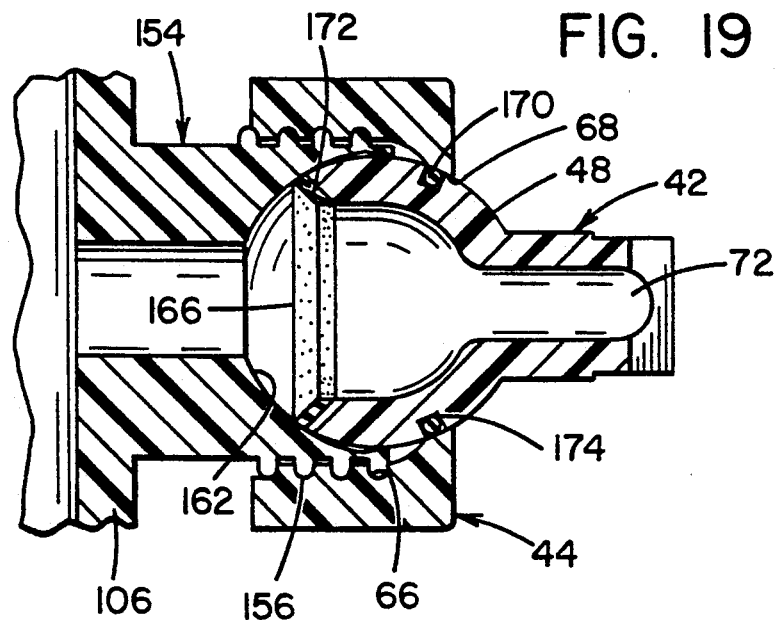
FIG. 19 is a fragmentary elevational view of a modified spray nozzle in accordance with the invention showing an alternative means to prevent leaking between the nozzle body and nozzle tip and between the nozzle tip and the nozzle cap.

In the embodiment of the invention shown in FIG. 18, to withstand even higher washer booth pressures, two O-ring grooves 168 and 174 are cut in the surface of spray tip spherical portion 48 to receive a pair of O-rings 170, which simultaneously seal the spray tip 42 against leakage between the wall of the body cavity 162 and between the cap 44. In the embodiment shown in FIG. 19, a hybrid seal is shown to simultaneously seal the spray tip against leakage between the wall of the body cavity 162 and between the cap 44. An O-ring 170, in O-ring groove 174, is placed between the spherical portion 48 of the spray tip 42 and the lip 172 of the spherical portion 48. As aforesaid with respect to FIG. 16, the lip 172 is molded and bonded integral with nozzle spray tip spherical portion 48 from a compatible plastic having a lower modulus of compressibility than that of the spherical portion.

Figure 20:
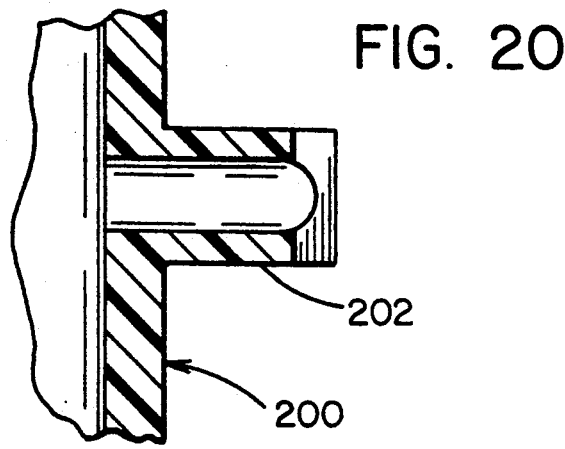
FIG. 20 is a fragmentary elevational view in section of a modified riser pipe segment in accordance with the invention, in which the nozzle tip is molded integral with the pipe section.

The embodiments of the invention shown in FIGS. 7 through 19 contemplate the use of commercially available prior art nozzle tips and caps, which provide ready means to adjust both the type and the direction of spray against a work product. There are, however, some washer booth operations which are continuous, and in which there is no need to vary the type or the direction of the spray. Under these circumstances, it is sometimes more economical to forgo the advantages of the body cavity and tip ball and socket type adjustability. For this type of application, the embodiment of the invention shown in FIG. 20 is most suitable. Therein is shown a riser pipe segment 200 in which the nozzle tip 202 is integrally molded. By elimination of the spray nozzle body 154 and the spray nozzle cap 44, this embodiment of the invention eliminates all pressure loss due to leakage.

The inventive concept of riser pipe segments makes the embodiment of FIG. 20 possible since any clogging of a particular spray nozzle tip can be serviced by removing from the riser the pipe segment in which the particular spray nozzle tip has been molded. The pipe segment inventive concept also enables the changing of spray nozzle tips and/or the redirecting of the tips to accommodate changed requirements in spraying specifications by replacing pipe segments with other pipe segments having spray tips with different spraying characteristics.

Figure 21:
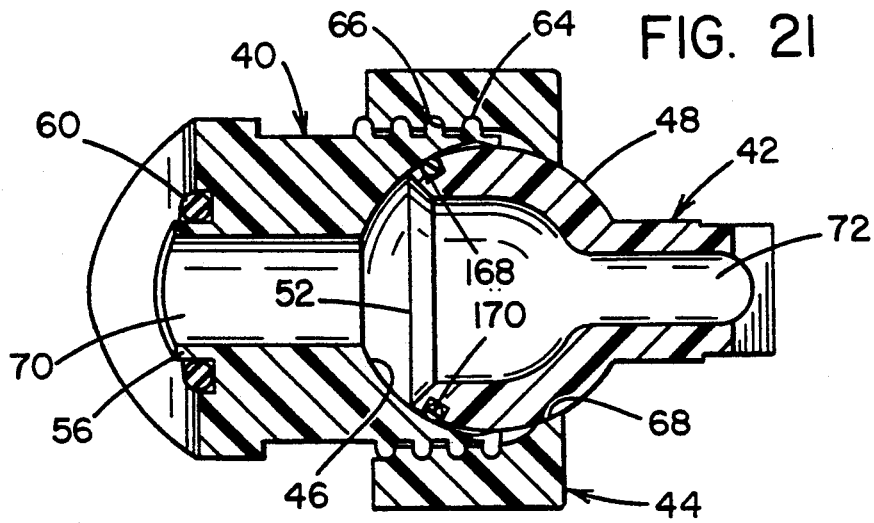
FIG. 21 is an elevational view in section of a modified spray nozzle similar to the spray nozzle shown in FIG. 15.

As previously discussed, prior art nozzles, such as shown in FIGS. 3 through 6, although adequate for low pressure spraying applications, tend to leak at pressures over 30 psi, and the leaking increases proportionately to the pressure increase. The subject invention has introduced sealing means in its nozzles which have minimized nozzle leaking at high pressures. These means have been previously discussed with respect to the modified nozzles shown in FIGS. 15 through 19. Although the nozzle bodies 154 are integrally molded into each pipe segment 106, the tips 42 and caps 44 are similar to the prior art tips and caps of FIGS. 3 through 6, but have been modified with means to improve sealing between body, tip, and cap. These same improvements are equally beneficial in the FIGS. 3 through 6 prior art nozzles, as shown in FIGS. 21 through 25, wherein like parts are identified by like numbers. Thus, as shown in FIG. 21, an O-ring 170 is fitted in an O-ring groove 168 formed adjacent the rim 52 of tip 42. This O-ring improves sealing between tip 42 and body 40.

Figure 22:
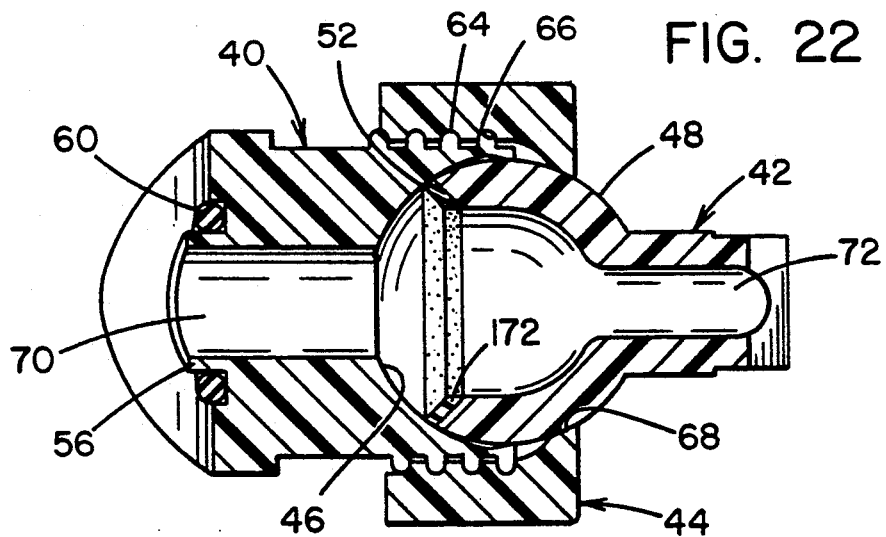
FIG. 22 is an elevational view in section of a modified spray nozzle similar to the spray nozzle shown in FIG. 16.

In FIG. 22, in lieu of an O-ring, the rim 52 is reinforced with a washer-like seal of plastic 172 with durometer hardness less than that of tip 42. The washer 172 compresses against the inner wall 46 of body 40 to improve sealing therebetween.

Figure 23:
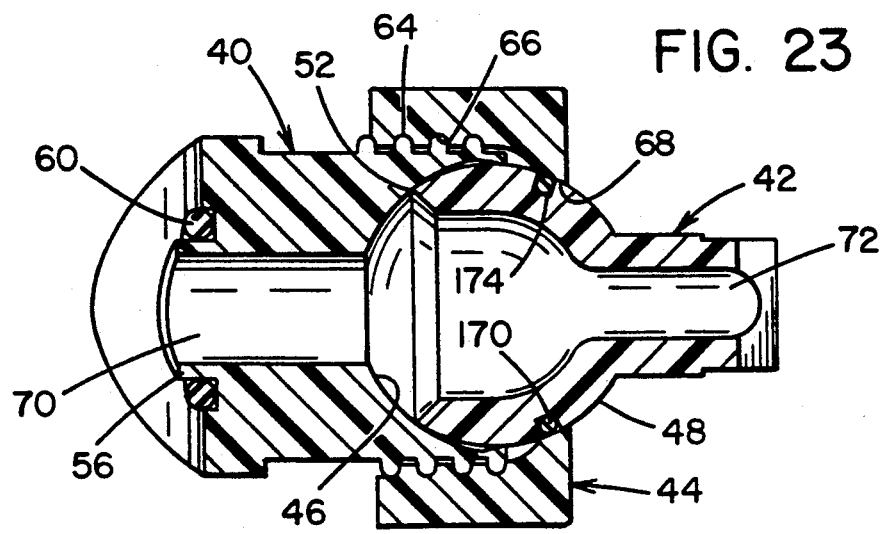
FIG. 23 is an elevational view in section of a modified spray nozzle similar to the spray nozzle shown in FIG. 17.

In another embodiment of the invention, as shown in FIG. 23, an O-ring groove 174 is formed in the tip 42 adjacent the groove 68 of cap 44 to receive an O-ring 170 therein. When the threads 64 of the body 40 engage the threads 66 of the cap 44, O-ring 170 is compressed into sealing engagement with groove 68 of cap 44.

The embodiment of the invention shown in FIG. 24 combines the O-ring seal of FIG. 21 with the O-ring seal of FIG. 23. As shown, O-rings 170 seal the tip 42 to both the body 40 and the cap 44.

The embodiment of the invention shown in FIG. 25 is a modification of the invention shown in FIG. 24. In FIG. 25, instead of an O-ring 170 to seal between the tip 42 and the body 40, the washer-like seal 172 of FIG. 22 is substituted in FIG. 25 for applications where it is not feasible to cut an O-ring groove adjacent to the tip rim 52. An O-ring 170 is fitted in O-ring groove 174 to provide a seal between tip 42 and groove 68 of cap 44, such as is also shown in FIGS. 23 and 24.

Figure 26:
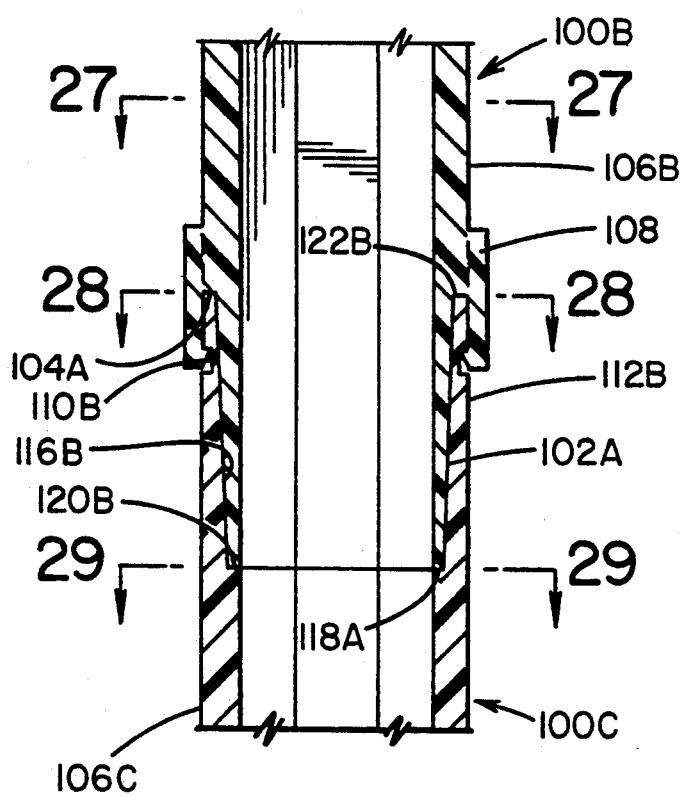
FIG. 26 is a fragmentary elevational view in section of a preferred embodiment of a segmented riser pipe similar to the riser pipe shown in FIG. 11.
Figure 27:
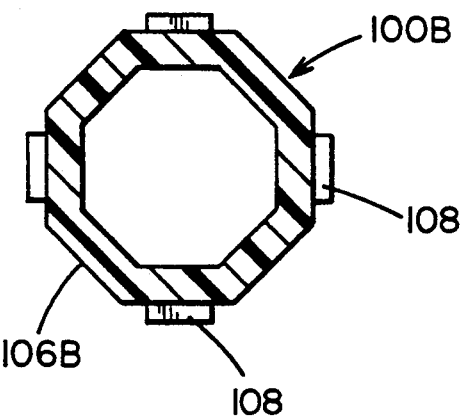
FIG. 27 is a cross-sectional view of the segmented riser pipe of FIG. 26 taken along the line 27—27 of FIG. 26.

The fragmentary riser pipe segment of FIG. 26 is similar to the riser pipe segment of FIGS. 7 and 8. However, as shown by FIG. 27, segment wall 106B of riser pipe segment 100B is polygonal in cross section. Specifically, the embodiment of FIGS. 26 through 29 is octagonal in cross section but is representative of any multi-sided riser pipe segment which embodies the subject inventive concepts.

Figure 28:
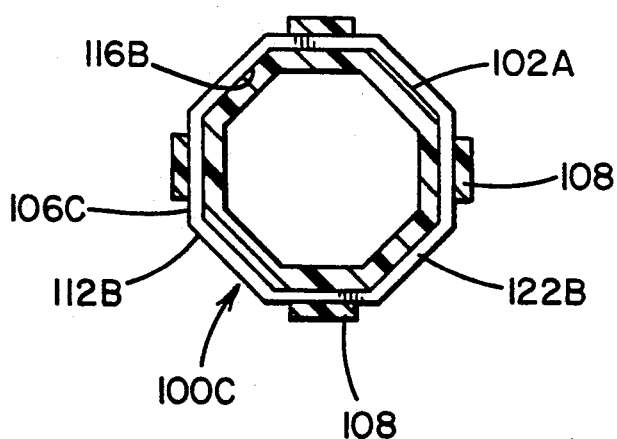
FIG. 28 is a cross-sectional view of the segmented riser pipe of FIG. 26 taken along the line 28—28 of FIG. 26.
Figure 29:
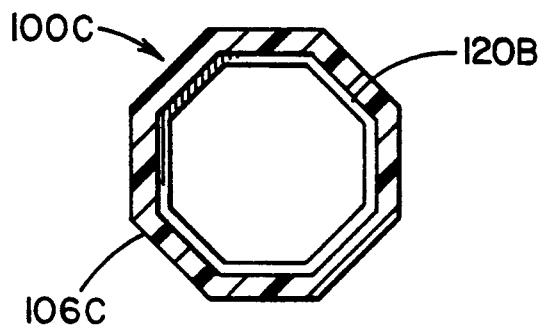
FIG. 29 is a cross-sectional view of the segmented riser pipe of FIG. 26 taken along the line 29—29 of FIG. 26.

Referring to FIGS. 26 and 28, rim 122B is shown to be octagonal for abutting contact with octagonal ledge 104A. In like manner, octagonal rim 118A is in abutting contact with octagonal ledge 120B, as shown in FIGS. 26 and 29.

As best shown in FIG. 26, lower end 102A of riser pipe segment 100B comprises eight exterior faces inwardly inclined and tapered toward rim 118A to form an eight-sided frusto-pyramidal end 102A. The upper end 112B of riser pipe segment 100C comprises eight interior faces inclined and tapered to form an eight-sided frusto-pyramidal socket 116B adapted to receive frusto-pyramidal end 102A therein in sealing engagement therebetween. The sealing can be accomplished with an interference fit between frusto-pyramidal end 102A and frusto-pyramidal socket 116B and/or an annular groove 134 and bead 140 seal substantially as shown in FIG. 14.

In summation, the inventive riser pipe segment, 100A, FIGS. 11A and 11B, can be used in combination with the prior art nozzle 18, shown in FIGS. 3 through 6, for low pressure applications. For higher pressure applications, the improved nozzles illustrated in FIGS. 21 through 25 may be used in combination with riser pipe segment 100A. For still higher pressure applications, the preferred embodiments of the invention are shown in FIGS. 7 through 11 and 12 through 19, wherein the body 154 is molded integrally with the segmented riser pipe 100. Specifically, as best shown in FIG. 11 the body 154 is integral with the segmented riser pipe and prior art standard tips 42 and caps 44 are assembled on inventive body 154. The improved tips and caps of FIGS. 15 through 19 are intended for use in high pressure applications in combination with integrally molded bodies 154.

Although the cylindrical pipe segment of FIGS. 7 through 11 and FIGS. 12 through 19 illustrates the preferred embodiment of the invention, the polygonal segmented pipe segment shown in FIGS. 26 through 29 also constitutes an alternative embodiment of the invention. An octagonal pipe section is disclosed for illustrative purposes only, and it is intended and understood that this embodiment of the invention is not limited to any specific polygonal configuration. In the embodiment of FIGS. 26 through 29, horizontal indexing between upper and lower riser pipe segments is predetermined by the number of pyramidal matching faces on interfitting riser pipe segment ends 102A and 112B. Thus, in this embodiment of the invention, detents 108 and grooves 110B are not required for indexing purposes, although they are nevertheless effective to interlock and stabilize upper and lower joined riser pipe end segments in some applications, as shown in FIG. 14.

The foregoing disclosure and discussion relate to preferred exemplary embodiments of the invention. However, it should be understood that other variants and embodiments thereof will become apparent to those skilled in the art upon a reading of the specification taken in conjunction with a study of the attached drawings. Furthermore, it should be understood that such variants and embodiments are possible within the spirit and scope of the invention, as defined by the appended claims.

What is claimed is:

1. For use in a commercial washer booth to circulate a bath liquid, said washer booth having headers, risers connected to said headers, and spray nozzles connected to said risers, the improvement comprising a plurality of separately molded polyolefin pipe segments and means to quick connect and disconnect said pipe segments without threaded fasteners to form a riser in which each pipe segment is adjustable about its longitudinal axis independent of any other interconnected pipe segment.

2. The improvement in risers of claim 1, including a polyolefin spray nozzle body integrally molded and leak-proof sealed to each of said pipe segments.

3. The improvement in risers of claim 1, wherein said pipe segments are interchangeable and are each substantially twelve inches in length.

4. The improvement in risers of claim 1, wherein each said pipe segments is molded from a polyolefin selected to withstand bath liquid temperatures of substantially 220° F.

5. The improvement in risers of claim 1, wherein polypropylene is the polyolefin selected to withstand bath liquid temperatures of substantially 220° F.

6. The improvement in risers of claim 1, wherein said polyolefin is glass fiber reinforced.

7. The improvement in risers of claim 1, wherein said pipe segment is molded with a glass-filled polyolefin.

8. The improvement in risers of claim 1, wherein said pipe segment is molded with a glass-bead reinforced polyolefin.

9. The improvement in risers of claim 2, wherein said spray nozzle body is molded from the same polyolefin composition used to mold said pipe segment.

10. The improvement in risers of claim 3, wherein said means to connect said pipe segments comprises the exterior one end of a first pipe segment being frusto-conical; the opposite interior end of said first pipe segment being frusto-conical and sized to receive therein an exterior frusto-conical end of a like second pipe segment; means to delimit the penetration of said first pipe segment exterior one end into said like second pipe segment interior frusto-conical end; and means to rotatably retain said first pipe segment exterior frusto-conical end in said second pipe segment interior frusto-conical end including a circumferential bead on the said one end of a first pipe segment and a matching circumferential groove in the interior surface of said second pipe segment interior frusto-conical end adapted to slidably receive therein said first pipe segment circumferential bead.

11. The improvement in risers of claim 10, including means to seal said first and second pipe segments including an O-ring circumferential groove in the exterior surface of said first pipe segment frusto-conical end and an O-ring positioned in said circumferential groove for sealing contact with said interior surface of said second pipe segment.

* * * * *